US009475340B2

(12) United States Patent
Fulton et al.

(10) Patent No.: US 9,475,340 B2
(45) Date of Patent: Oct. 25, 2016

(54) METHOD AND ARTICLE FOR CONSTRUCTING A THREE DIMENSIONAL DECORATIVE OBJECT

(71) Applicant: David L. Osment, Naples, FL (US)

(72) Inventors: C. Dwayne Fulton, Osage Beach, MO (US); Julia Ann Barton, Gravois Mills, MO (US); Dennis M. Rupp, Sunrise Beach, MO (US)

(73) Assignee: David L. Osment, Naples, FL (US)

( * ) Notice: Subject to any disclaimer, the term of this patent is extended or adjusted under 35 U.S.C. 154(b) by 247 days.

(21) Appl. No.: 14/043,443

(22) Filed: Oct. 1, 2013

(65) Prior Publication Data

US 2015/0093558 A1    Apr. 2, 2015

(51) Int. Cl.
*B32B 5/02*         (2006.01)
*B32B 15/20*        (2006.01)
(Continued)

(52) U.S. Cl.
CPC .................. *B44F 7/00* (2013.01); *A63H 33/42* (2013.01); *B32B 5/022* (2013.01); *B32B 7/06* (2013.01);
(Continued)

(58) Field of Classification Search
CPC .................... Y10T 29/49982; Y10T 29/4998; Y10T 442/656; Y10T 428/24967; Y10T 428/24959; B44F 7/00; B44F 9/00; B32B 15/20; B32B 15/12; B32B 5/022; B32B 7/12; B32B 15/14; B32B 2262/0276; B32B 2307/726; B32B 2262/062; B32B 2307/402; B32B 2307/748; B32B 2255/06; B32B 2451/00; B32B 2262/14; B44B 11/00
USPC ................... 29/527.2, 527.1; 428/16, 17, 15
See application file for complete search history.

(56) References Cited

U.S. PATENT DOCUMENTS 2,003,752 A  *  6/1935  Landt ..................... B29C 70/08
                                                    428/460
2,876,575 A  *  3/1959  Leika ..................... B42D 15/02
                                                    156/248
(Continued)

FOREIGN PATENT DOCUMENTS

DE      20 2004 001710 U1      6/2004
DE          202004001710 U1 *  6/2004  ............. A63H 19/36
(Continued)

OTHER PUBLICATIONS

European Search Report dated Nov. 11, 2014 issued for related EPO application 14171630.8. (5 pgs.).

*Primary Examiner* — Christopher Besler
*Assistant Examiner* — Bayan Salone
(74) *Attorney, Agent, or Firm* — Stinson Leonard Street LLP

(57) ABSTRACT

A method of constructing a three dimensional decorative object from a foil sheet and a fabric overlay is the subject of the invention. The method includes shaping the foil sheet into a three dimensional configuration, providing the foil sheet with an adhesive coating and adhering a fabric overlay to the foil. In another aspect of the invention the foil sheet has a fabric overlay adhered to one side and is utilized to form a three dimensional decorative object by shaping the sheet into the desired three dimensional object and then providing a decorative finish to the fabric side of the sheet. The method may include applying a layer of plaster on top of the fabric overlay. An article useful in constructing a three dimensional object is also encompassed by the invention. The article comprises a foil sheet having a fabric overlay adhered to one side. The article of the invention may also be presented in a kit which includes a foil sheet having a fabric overlay adhered to one side, a quantity of a pliable material sufficient to cover at least a portion of the fabric overlay and instructions for preparing the pliable material for application to the fabric.

26 Claims, 3 Drawing Sheets

(51) Int. Cl.
   *B32B 15/12*    (2006.01)
   *B44F 7/00*     (2006.01)
   *B44F 9/00*     (2006.01)
   *B32B 15/14*    (2006.01)
   *B32B 7/06*     (2006.01)
   *B44B 11/00*    (2006.01)
   *B32B 7/12*     (2006.01)
   *B44C 3/00*     (2006.01)
   *A63H 33/42*    (2006.01)

(52) U.S. Cl.
   CPC ............... *B32B 7/12* (2013.01); *B32B 15/12* (2013.01); *B32B 15/14* (2013.01); *B32B 15/20* (2013.01); *B44B 11/00* (2013.01); *B44C 3/00* (2013.01); *B44F 9/00* (2013.01); *B32B 2255/06* (2013.01); *B32B 2262/0276* (2013.01); *B32B 2262/062* (2013.01); *B32B 2262/14* (2013.01); *B32B 2270/00* (2013.01); *B32B 2307/402* (2013.01); *B32B 2307/726* (2013.01); *B32B 2307/748* (2013.01); *B32B 2451/00* (2013.01); *Y10T 428/24967* (2015.01); *Y10T 442/656* (2015.04)

(56) References Cited

U.S. PATENT DOCUMENTS

| | | | | |
|---|---|---|---|---|
| 3,311,520 A * | 3/1967 | Michaelson | ............ | B32B 37/00 156/209 |
| 3,960,639 A * | 6/1976 | Kudo | ............ | B44F 9/02 156/222 |
| 3,976,807 A * | 8/1976 | Sweeney | ............ | B44F 9/00 156/61 |
| 4,022,650 A * | 5/1977 | Gurgui | ............ | D06N 7/0057 156/498 |
| 4,054,711 A * | 10/1977 | Botsolas | ............ | B29C 70/00 428/421 |
| 4,127,433 A * | 11/1978 | Gurgui | ............ | E04F 13/002 156/498 |
| 4,205,110 A * | 5/1980 | Jean | ............ | B32B 15/08 428/213 |
| 4,656,081 A * | 4/1987 | Ando | ............ | D04H 1/70 28/104 |
| 4,942,084 A * | 7/1990 | Prince | ............ | B27D 1/00 428/317.1 |
| 4,950,509 A * | 8/1990 | DeMott | ............ | A41G 1/00 156/61 |
| 5,308,075 A * | 5/1994 | Theriault | ............ | A63B 69/3652 29/773 |
| 5,326,267 A * | 7/1994 | Brokaw | ............ | G09B 25/06 273/241 |
| 5,486,408 A * | 1/1996 | Sentendrey | ............ | A62C 8/08 428/110 |
| 6,080,453 A * | 6/2000 | Weder | ............ | A01G 5/04 428/127 |
| 6,277,468 B1 * | 8/2001 | Nakamoto | ............ | B32B 15/12 428/106 |
| 6,613,402 B2 * | 9/2003 | Fulton | ............ | A41G 1/007 156/61 |
| 6,949,137 B1 * | 9/2005 | Erling | ............ | C08L 3/00 106/162.5 |
| 7,592,041 B2 * | 9/2009 | Fulton | ............ | A63H 33/42 264/139 |
| 2008/0251411 A1 * | 10/2008 | Walker | ............ | B32B 5/022 206/531 |
| 2009/0229747 A1 * | 9/2009 | Olson | ............ | C08J 5/24 156/305 |

FOREIGN PATENT DOCUMENTS

| | | | | |
|---|---|---|---|---|
| EP | 0 195 234 A2 | 9/1986 | | |
| EP | 0195234 B1 * | 7/1991 | ............... | B44C 3/02 |
| EP | 1 767 347 A1 | 3/2007 | | |
| EP | 2 684 926 A1 | 1/2014 | | |
| EP | 2857220 A1 * | 4/2015 | ............... | B44F 7/00 |
| FR | 2 868 327 A1 | 10/2005 | | |
| FR | 2868327 A1 * | 10/2005 | ............... | A63H 33/42 |
| GB | 1767347 A1 * | 3/2007 | ............... | B32B 5/022 |
| IT | 2383112 B1 * | 6/2013 | ............... | B32B 3/14 |
| JP | 2684926 A1 * | 1/2014 | ............... | C09J 7/048 |

* cited by examiner

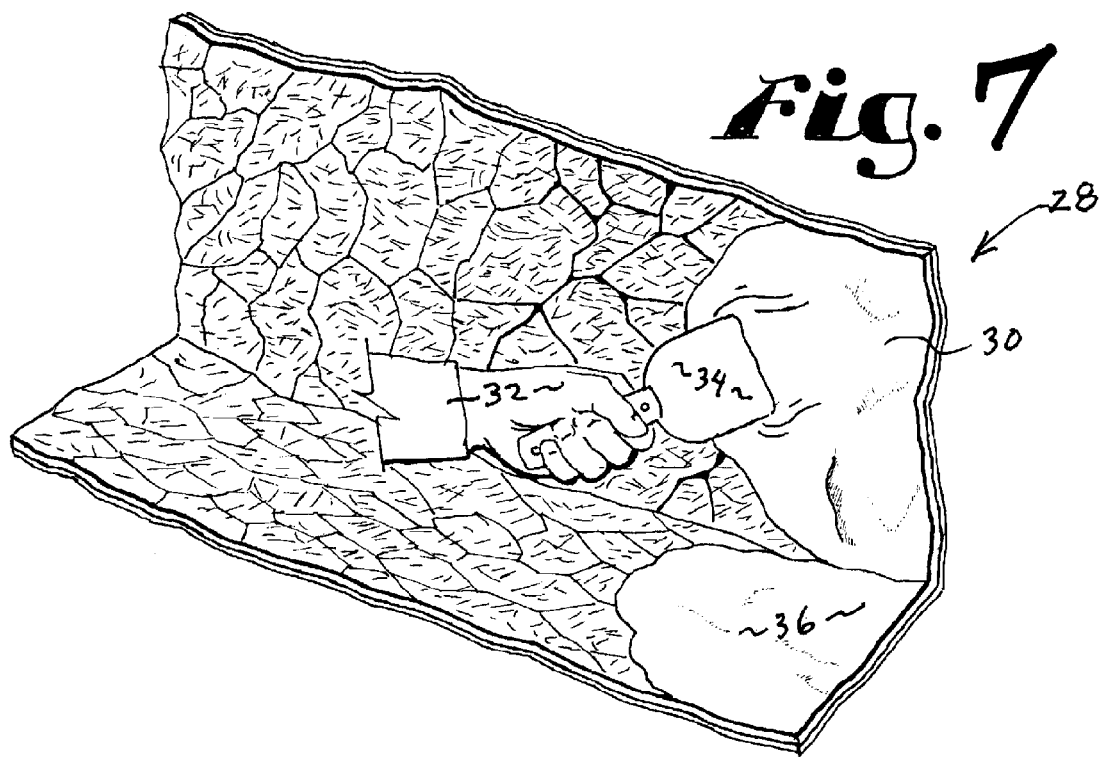
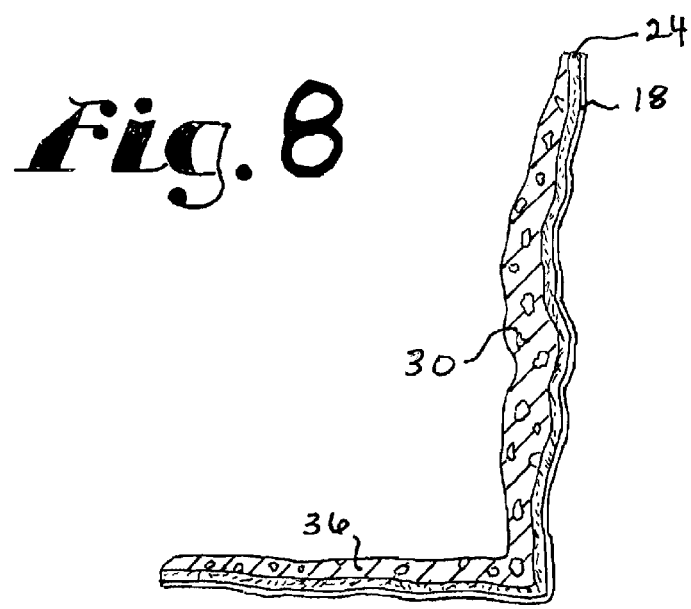

METHOD AND ARTICLE FOR CONSTRUCTING A THREE DIMENSIONAL DECORATIVE OBJECT

BACKGROUND OF THE INVENTION

1. Field of the Invention

This invention relates generally to a method of constructing three dimensional objects useful in forming artistic works and artificial scenery. More particularly, the invention relates to a method and article for constructing three dimensional objects from a laminate of foil and cloth to which a layer of plaster or resinous-like material may be applied.

2. Background of the Invention

It is well known to form artificial landscapes as well as other decorative items utilizing plaster cloth applied to a form constructed of cardboard, Styrofoam, wadded newspaper or similar material. Wadded newspaper is the most common material used by model railroad hobbyists. The plaster cloth has typically been a gauze-like material impregnated with dried plaster which is activated by dipping it in water. The activated plaster is laid over the rough form provided by the wadded newspaper and shaped into a desired configuration to form an object such as a vase or simulated natural landscaping including train tunnels, rocks, fields and bodies of water. The procedure of wadding newspapers to form a support for a hollow object is both time consuming and difficult. It requires large quantities of newspaper print which is becoming a scarce item in many households. However, without some base there is no means for supporting the plaster impregnated gauze which, when cured, provides the strength for the finished object. Plaster impregnated gauze is also becoming less readily available because of environmental concerns in manufacturing and the availability of substitute materials such as resins and fiberglass which are widely used in unrelated applications but are more expensive. Also, dipping the plaster impregnated gauze in water for the proper amount of time to activate the plaster requires some degree of skill and is a somewhat messy procedure. Often times multiple layers of the plaster impregnated gauze are required to give the desired configuration to the final object and in the case of tunnels for miniature train layouts, to provide the necessary structural strength.

Another disadvantage of constructing objects utilizing the known methods is that once the plaster cloth is configured on the rough form made from newspaper wadding (or other material) there is minimal opportunity to modify the shape as once the plaster begins to set this is not possible. It is also a disadvantage of the prior art technique that gauze often protrudes though the plaster interfering with the ability to sand or paint the surface.

Still another disadvantage of the prior art technique is its time consuming nature. Each individual sheet of plaster impregnated gauze must first be dipped in water and then carefully placed in position with the desired configuration. This process is repeated dozens of times for even a modest size landscape replica for a model train layout.

BRIEF SUMMARY OF THE INVENTION

The present invention comprises a method and article for constructing a three dimensional decorative object, such as tunnels and other artificial landscapes, which eliminates the need to build a support out of wadded newspapers, cardboard or sytrofoam in most applications. It also eliminates the need for utilizing individual sheets of plaster impregnated gauze which must be dipped in water and then laid up one at a time. This is accomplished by employing a foil sheet to which has been adhesively secured a fabric layer. The foil has sufficient strength to support its own weight and can be easily shaped into any configuration. If it is desired to change the configuration this may be accomplished by reforming the foil even after initial placement. In some instances it will be desired to apply a plaster (or resinous material) layer over the cloth utilizing a putty knife or brush which will typically require less effort than "laying up" multiple layers of plaster impregnated gauze. The foil provides a substrate which can be shaped and formed even after plaster is applied.

The invention also encompasses an article useful in constructing a three dimensional object. The article comprises a foil sheet, an adhesive applied to one side of the sheet and a cloth fabric adhered to the sheet.

Another aspect of the invention is a kit for use in constructing a three dimensional object. The kit includes the aforedescribed foil sheet having a fabric overlay adhered to one side, the sheet being characterized by sufficient strength to be formed into a self supporting three dimensional object, a quantity of pliable material (such as plaster) sufficient to cover at least a portion of the fabric overlay and instructions for preparing the pliable material for application to the fabric overlay.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 7 is a perspective view of the article shown in FIG. 5 which has been shaped into a desired configuration to simulate an actual landscape with a layer of plaster material being applied by an operator; and FIG. 8 is a vertical cross sectional view through the plastered landscape section of FIG. 7.

DETAILED DESCRIPTION OF THE INVENTION

Figure 1:
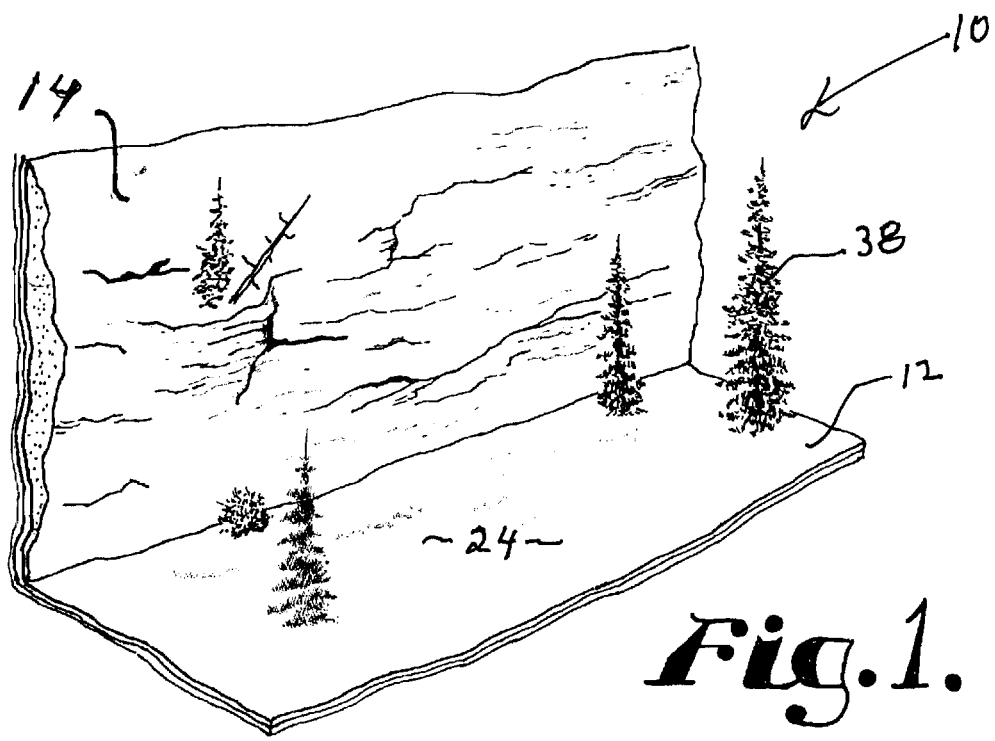
FIG. 1 is a perspective view of a completed three dimensional decorative object formed according to the method of the present invention.

Referring initially to FIG. 1 a three dimensional decorative object in the form of an artificial landscape is designated generally by the numeral 10 and includes a horizontal ground portion 12 and a vertical cliff portion 14.

Figure 2:
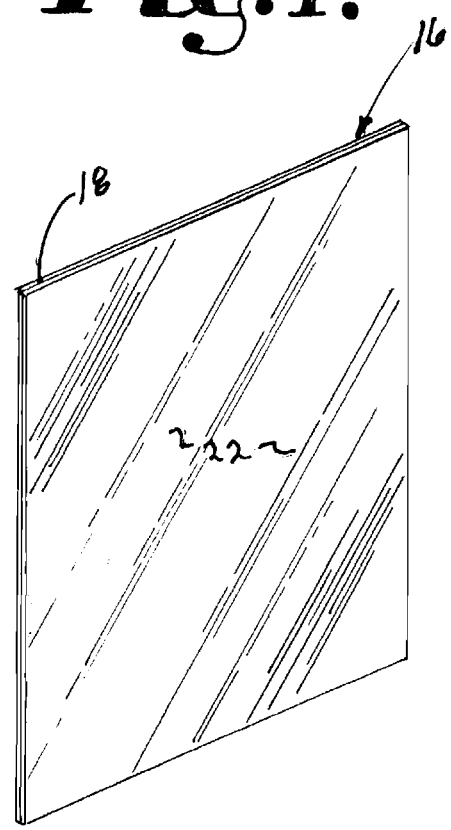
FIG. 2 is a perspective view of a foil sheet to which has been applied an adhesive layer and a release paper.
Figure 3:
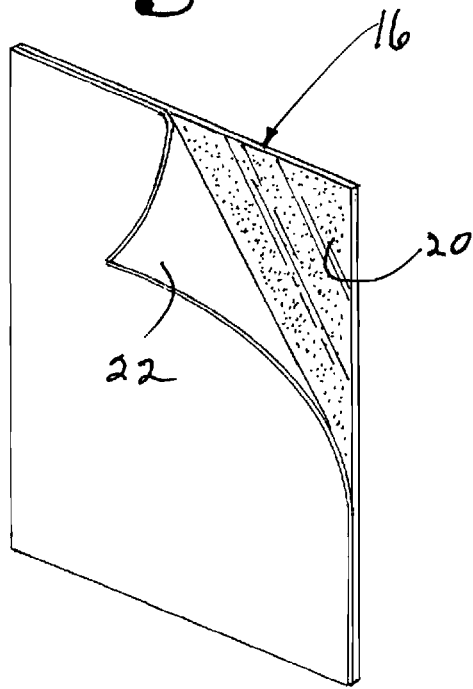
FIG. 3 is another view of the foil sheet shown in FIG. 2 with the release paper partially removed to expose the adhesive layer.

The landscape 10 is formed from a foil composite 16 depicted in FIGS. 2 and 3. Composite 16 is formed from a sheet of foil 18 which has been coated with an adhesive 20 that is then protected by a release paper 22. Foil 18 is preferably 99.9% pure aluminum with a thickness of about 0.06 to 0.10 mm. The preferred thickness is 0.08 mm. The aluminum should have a density of about 2.7 grams per cubic centimeter. Adhesive layer 20 preferably comprises a polyurethane-ethyl acetate copolymer emulsion. The adhesive is preferably transparent and odorless. Release paper 22 is of a type commonly used in industrial applications and is designed to be easily removed from adhesive 20 without degrading the latter.

Figure 4:
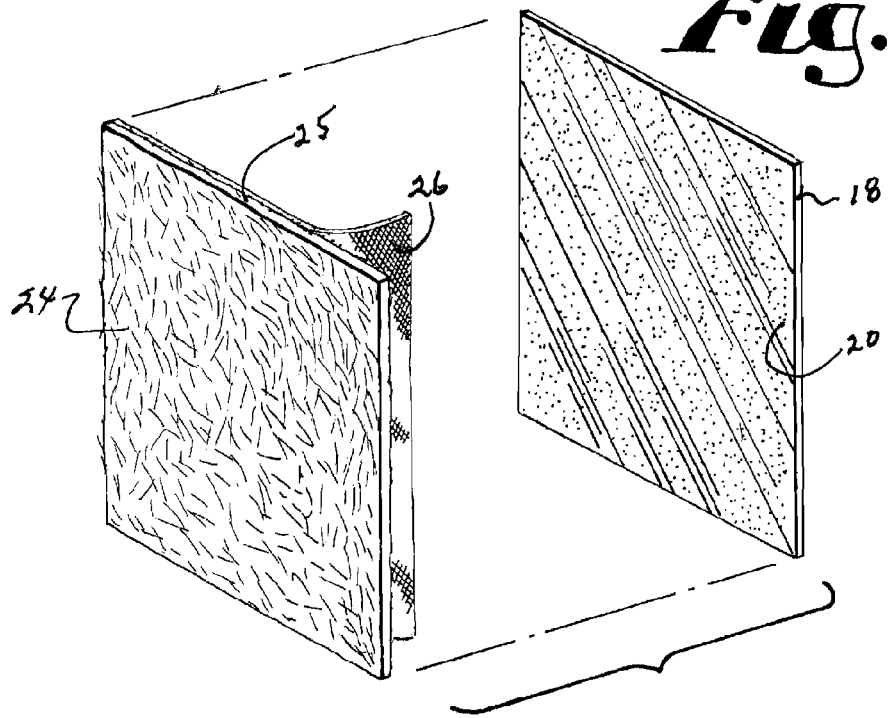
FIG. 4 is an exploded view of the foil sheet with the release paper removed and a fabric overlay aligned for adhering to the foil.

Referring additionally to FIG. 4, release paper 22 has been removed completely from foil sheet 18 and a fabric overlay 24 is positioned for joinder to the foil sheet. Fabric overlay 24 comprises a nonwoven cloth layer 25 and a polypropylene backing 26. The cloth layer 25 is preferably a nonwoven cotton polyester blend although other suitable fabrics may be employed. The cloth layer 25 is joined to the net-like backing 26 by heat sealing. Backing 26 is preferably an open netting but may also be a thin film. The overall thickness of the fabric overlay 24 is approximately 0.2 to 5 mm, preferably 0.4-3 mm. The cloth layer preferably has a water absorbency of 1000-1200% by weight.

Figure 5:
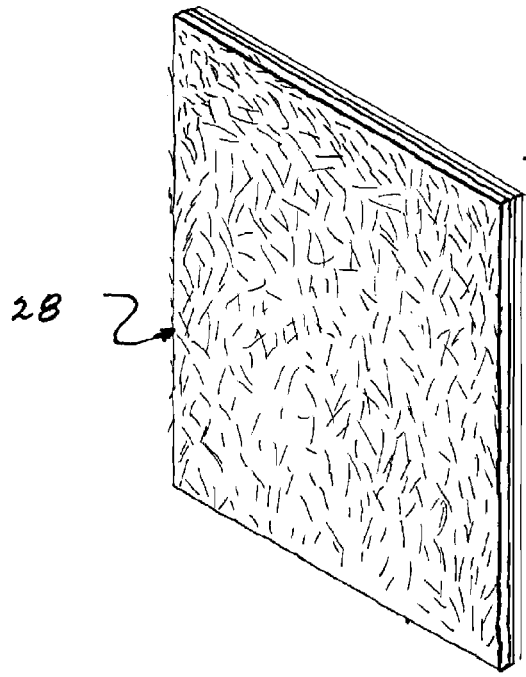
FIG. 5 is a perspective view of the completed useful article comprised of the foil sheet, an adhesive layer and the fabric overlay.
Figure 6:
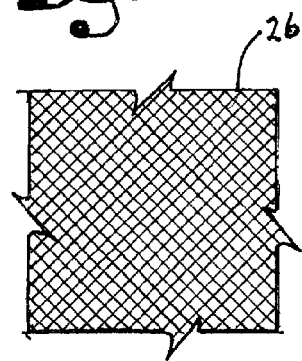
FIG. 6 is a greatly enlarged fragmentary view of the backing material which forms a portion of the fabric overlay.

FIG. 5 shows the completed article 28 after the release paper 22 has been removed and the fabric overlay 24 has been adhered to the foil layer 18. This useful article will find application for forming numerous three dimensional objects such as vases, landscapes, tunnels and decorative wall panels.

In many applications it will be desirous to apply a layer of plaster 30 or resin (FIG. 7) to an article which has been shaped into a desired landscape pattern as illustrated in this figure. The plaster is easily applied by an operator whose hand 32 is holding a tool 34. In the depiction of FIG. 7 tool 34 is a putty knife although in some instances the plaster like material may be applied with a brush. Plaster layer 30 provides additional strength for landscape depictions such as cliffs or tunnels while also offering additional landscaping options through molding of the plaster before it cures. With certain plasters knives and other tools may be used for carving and cutting after curing to depict rock patterns, streams and vegetation. Paint and resinous materials will typically be used to enhance the appearance of the three dimensional object. Plaster 30 may also be used to provide the appearance of a recessed area 36 in a horizontal portion of article 28.

In some instances article 28 may be marketed in kit form which will include article 28 in bulk, a quantity of a pliable material such as plaster for application to the fabric overlay 24 and instructions for preparing the pliable material for application to the fabric. The plaster for the kit is packaged in a water tight container and an appropriate quantity is emptied into a suitable container and before adding cold water. Typically four parts by volume of plaster are added to one part by volume of water with thorough mixing. The quantity of water is widely variable to achieve the appropriate mixture. Depending upon the consistency of the mixture and the desired thickness the plaster may be applied by brushing or with a putty knife with different amounts utilized in different areas to provide different aesthetic appearances. One of the advantages of the invention is the ability to make landscape protrusions such as rocks and trees by manipulating foil sheet 18 which is easier than with conventional plaster impregnated gauze. It is also easier to sand the applied plaster than with plaster gauze and gauze protruding through the plaster is not an issue with the present invention.

While in the preferred embodiment article 28 is provided as a fully assembled sheet or roll it is within the scope of the invention to utilize a foil sheet having a thickness of 0.015 to 0.2 mm and shaping the sheet into a three dimensional configuration to form the desired object after which an adhesive coating is applied and fabric overlay 24 is then adhered. The preferred thickness is 0.06-1.0 mm. The fabric overlay may also be adhered while the foil sheet is flat. These steps may be followed by the additional step of coating the fabric with plaster as previously described.

While the invention has been described with reference to plaster 30 it is to be understood that other pliable materials such as various resins, concrete, putty and portland cement may be utilized in the same manner. In most instances the final surface will be painted a desired color.

Since foil sheet 18 is characterized by sufficient strength to be self supporting when shaped into a three dimensional object the need for additional structural support when applying plaster or the like is largely eliminated but in the case of very large objects, such as a large tunnel for a miniature train layout additional structural support may be provided using wadded newspaper or Styrofoam. The time required to construct an object using article 18 as the starting material is greatly reduced over that required using plaster impregnated cloth. Another advantage of the invention is the ability to further shape the foil once the desired three dimensional object is formed. This provides for a much more versatile product for the sophisticated artist and one that is easier to use for the most amateur individual.

FIG. 1 also illustrates the ability to create an object without the utilization of plaster in conjunction with fabric overlay 24. In FIG. 1 vertical surface 14 has been covered with plaster layer 30 but horizontal surface 12 has not. Rather, horizontal portion 12 has been painted and trees 38 have been adhesively secured to this surface.

While in the preferred embodiment fabric overlay 24 includes the nonwoven cloth 25 and the nonfabric backing 26 it is to be understood that a fabric overlay comprising only cloth 25 could be utilized. One advantage, however, of the backing 26 formed from a netting of high molecular weight polymer is that two articles 28 may be easily joined together by pulling cloth 25 away from backing 26 on articles 28 so as to expose the adhesive surface 20. A small portion of the cloth 25 and backing 26 is then trimmed away to provide an exposed adhesive surface for joining a second article 18 to make a larger sheet.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without

What is claimed and desired to be secured by Letters Patent is as follows:

1. A method of constructing a three dimensional decorative object from a foil sheet and a fabric overlay comprising: shaping said foil sheet into a desired three dimensional object; providing said foil sheet with an adhesive coating; adhering said fabric overlay to said foil sheet: and coating said fabric overlay with a pliable material after the foil sheet is shaped into the desired three dimensional object and the fabric overlay is adhered to the foil sheet wherein the pliable material cures after it is applied to the fabric overlay; the pliable material is selected from the group consisting of plaster, resin, concrete, putty, and portland cement.

2. A method as set forth in claim 1, wherein the pliable material is selected from the group consisting of plaster, resin, concrete, putty, and portland cement.

3. A method as set forth in claim 1, wherein said foil sheet is characterized by a strength sufficient to accommodate formation into said three dimensional object.

4. A method as set forth in claim 1, further comprising coloring said fabric overlay.

5. A method as set forth in claim 1, wherein said three dimensional object comprises artificial scenery, and further comprising shaping said pliable material after it has partially cured to simulate terrain.

6. A method as set forth in claim 1, wherein said foil sheet comprises aluminum having a thickness of about 0.015 to 0.2 mm.

7. A method as set forth in claim 6, wherein said fabric overlay has a thickness of about 0.2 to 5 mm.

8. A method as set forth in claim 1, wherein said fabric overlay is characterized by a water absorbency of 1000-1200% by weight.

9. A method as set forth in claim 1, wherein said fabric overlay comprises a cloth layer joined to a nonfabric backing.

10. A method as set forth in claim 9, wherein said nonfabric backing comprises a plastic netting.

11. A method as set forth in claim 10, wherein said plastic netting is heat sealed to said cloth layer.

12. A method of constructing a three dimensional decorative object from a foil sheet having a fabric overlay adhered to one side, said method comprising: shaping said foil sheet and fabric overlay into a the desired three dimensional object; and applying a pliable material to the fabric overlay after the foil sheet and the fabric overlay are shaped into the desired three dimensional object wherein the pliable material cures after it is applied to the fabric overlay, the pliable material is selected from the group consisting of plaster. resin, concrete, putty, and Portland cement.

13. A method as set forth in claim 12, further comprising applying color to said pliable material.

14. A method as set forth in claim 12, wherein the pliable material is selected from the group consisting of plaster, resin, concrete, putty, and portland cement.

15. A method as set forth in claim 12, wherein said foil sheet comprises aluminum having a thickness of about 0.015 to 0.2 mm.

16. A method as set forth in claim 15, wherein said fabric overlay has a thickness of about 0.2 to 5 mm.

17. A method as set forth in claim 16, wherein said fabric overlay is characterized by a water absorbency of 1000-1200% by weight.

18. A method as set forth in claim 16, wherein said fabric overlay comprises a cloth layer joined to a nonfabric backing.

19. A method as set forth in claim 18, wherein said nonfabric backing comprises a plastic netting.

20. A method as set forth in claim 16, wherein said fabric overlay comprises a plastic netting joined to a cloth layer.

21. A method as set forth in claim 9, wherein the cloth layer comprises nonwoven cotton polyester blend.

22. A method as set forth in claim 9, wherein the nonfabric backing comprises polypropylene.

23. A method as set forth in claim 1, wherein the foil sheet comprises a first foil sheet, and further comprising:
   providing an article comprising a second foil sheet with a second fabric overlay adhered to the second foil sheet; and
   adhering the article to the first foil sheet.

24. A method as set forth in claim 18, wherein the cloth layer comprises nonwoven cotton polyester blend.

25. A method as set forth in claim 18, wherein the nonfabric backing comprises polypropylene.

26. A method as set forth in claim 12, wherein the foil sheet comprises a first foil sheet, and further comprising:
   providing an article comprising a second foil sheet with a second fabric overlay adhered to the second foil sheet; and
   adhering the article to the first foil sheet.

* * * * *